(12) United States Patent
Lee et al.

(10) Patent No.: US 11,883,785 B2
(45) Date of Patent: Jan. 30, 2024

(54) REVERSE OSMOSIS MEMBRANE, MANUFACTURING METHOD THEREFOR, AND WATER TREATMENT MODULE

(71) Applicant: LG CHEM, LTD., Seoul (KR)

(72) Inventors: Ayoung Lee, Daejeon (KR); Yun Seok Choe, Daejeon (KR); Chong Kyu Shin, Daejeon (KR); Phill Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 243 days.

(21) Appl. No.: 16/971,417

(22) PCT Filed: May 9, 2019

(86) PCT No.: PCT/KR2019/005540
§ 371 (c)(1),
(2) Date: Aug. 20, 2020

(87) PCT Pub. No.: WO2019/216656
PCT Pub. Date: Nov. 14, 2019

(65) Prior Publication Data
US 2021/0001279 A1     Jan. 7, 2021

(30) Foreign Application Priority Data

May 10, 2018   (KR) .................. 10-2018-0053731

(51) Int. Cl.
| | |
|---|---|
| *B01D 69/10* | (2006.01) |
| *B01D 61/02* | (2006.01) |
| *B01D 67/00* | (2006.01) |
| *B01D 69/02* | (2006.01) |
| *B01D 71/56* | (2006.01) |

(Continued)

(52) U.S. Cl.
CPC ....... *B01D 69/1071* (2022.08); *B01D 61/025* (2013.01); *B01D 67/0006* (2013.01); *B01D 69/02* (2013.01); *B01D 69/1251* (2022.08); *B01D 71/56* (2013.01); *C02F 1/441* (2013.01); *B01D 2325/04* (2013.01); *B01D 2325/24* (2013.01)

(58) Field of Classification Search
CPC .. B01D 69/10; B01D 69/107; B01D 69/1071; B01D 61/025; B01D 69/02; B01D 71/56; B01D 2325/24; B01D 2325/04; B01D 2325/06
See application file for complete search history.

(56) References Cited

U.S. PATENT DOCUMENTS

| | | | |
|---|---|---|---|
| 10,632,428 B2 | 4/2020 | Lee et al. | |
| 2002/0056535 A1* | 5/2002 | Hama | D21H 13/24 162/149 |

(Continued)

FOREIGN PATENT DOCUMENTS

| | | |
|---|---|---|
| CN | 103842055 A | 6/2014 |
| CN | 104781001 A | 7/2015 |

(Continued)

*Primary Examiner* — Ryan B Huang
(74) *Attorney, Agent, or Firm* — Bryan Cave Leighton Paisner LLP

(57) ABSTRACT

Provided is a reverse osmosis membrane comprising: a support layer comprising a support and a polysulfone layer; and an active layer, wherein a compression modulus is from 20 MPa to 40 MPa, to a method for manufacturing the same, and a water-treatment module.

9 Claims, 2 Drawing Sheets

(51) Int. Cl.
*C02F 1/44* (2023.01)
*B01D 69/12* (2006.01)

(56) References Cited

U.S. PATENT DOCUMENTS

| | | |
|---|---|---|
| 2003/0107150 A1 | 6/2003 | Hamanaka et al. |
| 2012/0043272 A1 | 2/2012 | Yoshida et al. |
| 2014/0014575 A1* | 1/2014 | Kwon .................. B01D 69/10 210/500.33 |
| 2014/0251896 A1 | 9/2014 | Hirozawa et al. |
| 2015/0352501 A1 | 12/2015 | Ko et al. |
| 2016/0129401 A1* | 5/2016 | Furuno ................. B01D 69/10 210/483 |
| 2016/0236156 A1* | 8/2016 | Rozenbaoum ....... B01D 63/103 |
| 2018/0001274 A1 | 1/2018 | Matsui et al. |
| 2018/0065093 A1 | 3/2018 | Takada et al. |
| 2019/0255487 A1 | 8/2019 | Nishi et al. |
| 2019/0291058 A1 | 9/2019 | Lee et al. |

FOREIGN PATENT DOCUMENTS

| | | |
|---|---|---|
| CN | 105032197 A | 11/2015 |
| CN | 107530644 A | 1/2018 |
| CN | 107899440 A | 4/2018 |
| EP | 2425889 A1 | 3/2012 |
| EP | 2902095 A1 | 8/2015 |
| EP | 3354333 A1 | 8/2018 |
| JP | H06-182166 | 7/1994 |
| JP | 2001-252541 | 9/2001 |
| JP | 2011011211 A | 1/2011 |
| JP | 2018-047455 | 3/2018 |
| KR | 10-2013-0080619 | 7/2013 |
| KR | 20140031627 A * | 3/2014 |
| KR | 10-2015-0079180 | 7/2015 |
| KR | 10-2015-0079213 | 7/2015 |
| KR | 10-2017-0023625 | 3/2017 |
| KR | 10-20170027265 | 3/2017 |
| KR | 10-2017-0081505 | 7/2017 |
| WO | 2010126113 A1 | 11/2010 |
| WO | 2013-047746 | 4/2013 |
| WO | 2017-052256 | 3/2017 |
| WO | 2018-074767 | 4/2018 |

* cited by examiner

[FIG. 1]
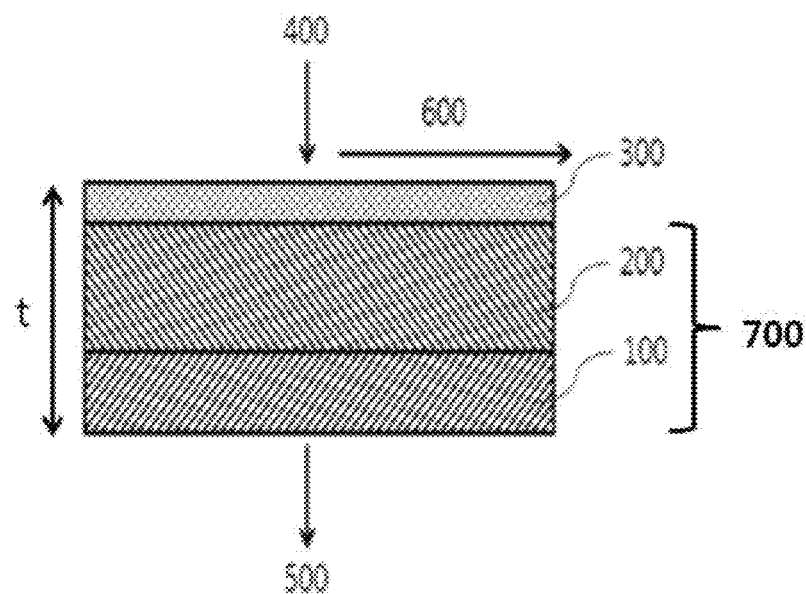
[FIG. 2]
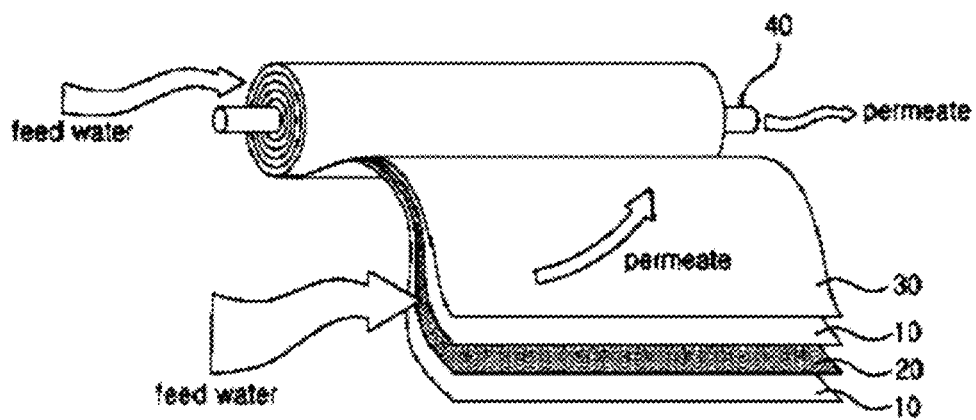

[FIG. 3]
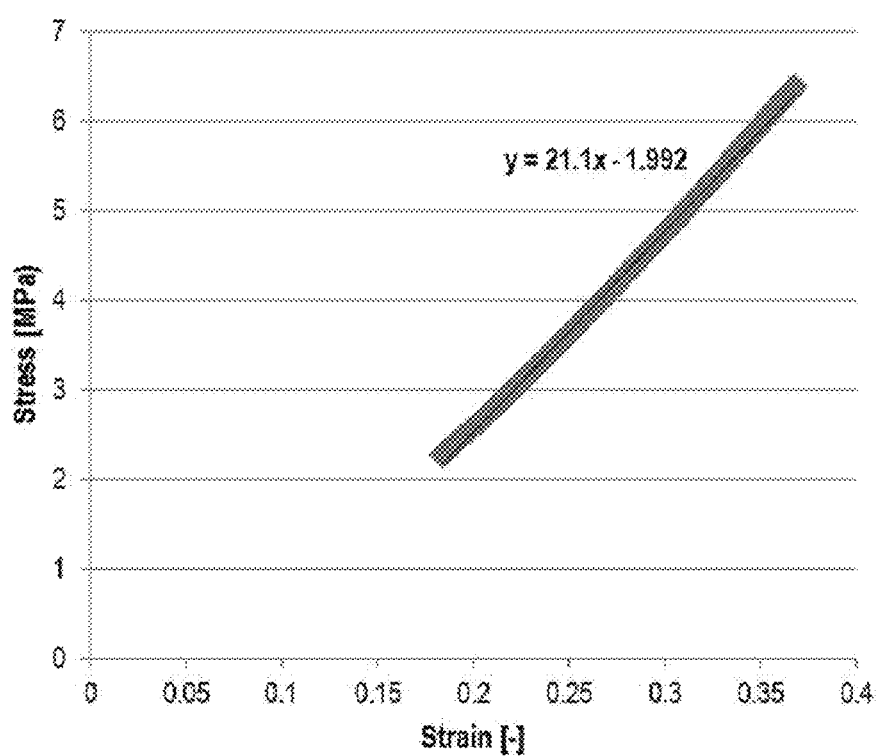

REVERSE OSMOSIS MEMBRANE, MANUFACTURING METHOD THEREFOR, AND WATER TREATMENT MODULE

CROSS-REFERENCE TO RELATED APPLICATIONS

This application is a National Stage Application of International Application No. PCT/KR2019/005540 filed on May 9, 2019, which claims priority to and the benefits of Korean Patent Application No. 10-2018-0053731, filed with the Korean Intellectual Property Office on May 10, 2018, the entire contents of which are incorporated herein by reference.

TECHNICAL FIELD

The present specification provides a reverse osmosis membrane, a method for manufacturing the same, and a water-treatment module.

BACKGROUND

A phenomenon that a solvent moves from, between two solutions separated by a semi-permeable membrane, a solution with a low solute concentration to a solution with a high solute concentration through the membrane is referred to as an osmosis phenomenon, and herein, a pressure working on the side of the solution with a high solute concentration due to the solvent migration is referred to as an osmotic pressure. However, when applying an external pressure higher than an osmotic pressure, the solvent moves toward the solution with a low solute concentration, and this phenomenon is referred to as reverse osmosis. Using a reverse osmosis principle, various salts or organic substances can be separated through a semi-permeable membrane with a pressure gradient as a driving force. A reverse osmosis membrane using such a reverse osmosis phenomenon has been used to supply water for household, construction and industry after separating substances at a molecular level and removing salts from salt water or sea water.

Typical examples of such a reverse osmosis membrane can include a polyamide-based reverse osmosis membrane, and the polyamide-based reverse osmosis membrane is manufactured using a method of forming a polyamide active layer on a microporous layer support. More specifically, the polyamide-based reverse osmosis membrane is manufactured using a method of forming a polysulfone layer on a non-woven fabric to form a microporous support, dipping this microporous support into an aqueous m-phenylenediamine (hereinafter, mPD) solution to form an mPD layer, and dipping this again into an organic trimesoyl chloride (TMC) solvent, bringing the mPD layer into contact with the TMC, and interfacial polymerizing the result to form a polyamide layer.

BRIEF DESCRIPTION

Technical Problem

The present specification is directed to providing a reverse osmosis membrane, a method for manufacturing the same, and a water-treatment module.

Technical Solution

One embodiment of the present specification provides a reverse osmosis membrane comprising a support layer comprising a support and a polysulfone layer; and an active layer, wherein a compression modulus is from 20 MPa to 40 MPa.

Another embodiment of the present specification provides a water-treatment module comprising one or more of the reverse osmosis membranes described above.

Another embodiment of the present specification provides a method for manufacturing the reverse osmosis membrane, the method comprising forming a support layer comprising a support and a polysulfone layer; and forming an active layer on the support layer.

Advantageous Effects

A reverse osmosis membrane according to one embodiment of the present specification exhibits excellent mechanical properties. Specifically, by having high compression modulus, a rate of defect occurrences can be reduced by reducing wrinkles when assembling the reverse osmosis membrane.

Furthermore, when driving a water-treatment module comprising the reverse osmosis membrane according to one embodiment of the present specification, stability can be increased.

DESCRIPTION OF DRAWINGS

FIG. 1 illustrates a reverse osmosis membrane according to one embodiment of the present specification.

FIG. 2 illustrates a water-treatment module according to one embodiment of the present specification.

FIG. 3 shows a graph obtaining compression modulus of a reverse osmosis membrane according to one embodiment of the present specification.

DETAILED DESCRIPTION

In the present specification, a description of one member being placed "on" another member includes not only a case of the one member adjoining the another member but a case of still another member being present between the two members.

In the present specification, a description of a certain part "comprising" certain constituents means capable of further comprising other constituents, and does not exclude other constituents unless particularly stated on the contrary.

Hereinafter, the present specification will be described in more detail.

One embodiment of the present specification provides a reverse osmosis membrane comprising a support layer comprising a support and a polysulfone layer; and an active layer, wherein a compression modulus is from 20 MPa to 40 MPa.

The reverse osmosis membrane having a compression modulus of 20 MPa to 40 MPa has increased mechanical strength by having high compression modulus, which can significantly reduce a rate of defect occurrences when assembling the reverse osmosis membrane by reducing wrinkles when assembling the reverse osmosis membrane, and as a result, a water-treatment module comprising one or more of the reverse osmosis membranes can be stably driven.

In addition, instead of an existing tensile strength property in a mechanical direction (MD) and a cross direction (CD) of a reverse osmosis membrane, compression modulus in a Z axis direction of the present specification can function as an important factor when rolling a leaf formed with the reverse osmosis membrane according to one embodiment of the present specification, a feed spacer and tricot filtration water. The Z axis direction means a thickness direction (t) of the reverse osmosis membrane when referring to FIG. 1.

In the water-treatment module, the number of included leaves can vary depending on sea to fresh water, industrial and household applications, however, 1 to 50 leaves can be included, and as few as 1 to 2, and as many as up to 50 leaves can be included. Laminated leaves of two or more are subject to force in a Z axis direction due to pressing between the laminated leaves when rolling as well as subject to force in a mechanical direction (MD), a driving direction, and therefore, compression modulus in a Z axis direction can be an important factor.

The compression modulus can be calculated by the following calculation formula using strain and stress measured under a condition of a circular probe diameter (D) of 5 mm, a compression rate of 0.1 mm/sec and a temperature of 25° C. using a texture analyzer.

⟨Calculation Formula⟩

$$\text{Compression modulus } (MPa) = \frac{\text{Stress}(MPa)}{\text{Strain}} = \frac{\left(\frac{F}{A}\right)}{\left(\frac{L}{Lo}\right)}$$

In the calculation formula,
F=force (gf) applied in the texture analyzer, $$A = \pi * \frac{D^2}{4}$$

L=thickness of the reverse osmosis membrane after the texture analyzer applies force (length, mm), and
Lo=thickness of the reverse osmosis membrane before the texture analyzer applies force (initial length, mm).

In the calculation formula, F can be from 3,000 gf to 15,000 gf, can be from 200 gf to 25,000 gf, and can be from 50 gf to 30,000 gf. In addition, A can be 19.63 mm². Lo can be from 0.5 mm to 5 mm, and can be preferably 1.57 mm. L is from 0 mm to 1 mm, and can be preferably from 0.25 mm to 0.65 mm.

By deducing a value by strain and stress when F and L correspond to the above-mentioned ranges, compression modulus using the calculation formula can be obtained.

Specifically, when referring to FIG. 3, a graph is plotted using strain obtained by the calculation formula as a horizontal axis and stress as a vertical axis, and by calculating the slope of the obtained graph, compression modulus (elastic modulus) can be calculated.

In one embodiment of the present specification, the texture analyzer can be, for example, a TA.XTplus Texture Analyzer, but is not limited thereto, and those known in the art can be used. The texture analyzer can mean a physical property analyzer or a physical property measuring device.

In one embodiment of the present specification, compression modulus of the reverse osmosis membrane calculated by the calculation formula is from 20 MPa to 40 MPa. Specifically, the compression modulus can be from 21 MPa to 35 MPa, and more specifically from 21.1 MPa to 27 MPa. The compression modulus of the reverse osmosis membrane satisfying the above-mentioned range can enhance mechanical strength of the reverse osmosis membrane, is advantageous when assembling the reverse osmosis membrane, and can reduce a rate of defect occurrences.

When the compression modulus is less than 20 MPa, a rate of defect occurrences increases when assembling the reverse osmosis membrane, and mechanical strength of the reverse osmosis membrane is low, which makes stable driving of a water-treatment module comprising the reverse osmosis membrane impossible.

When the compression modulus is greater than 40 MPa, hardness of the reverse osmosis membrane makes a rolling process difficult when manufacturing a spiral wound-type module.

In the present specification, physical properties of the support layer comprising a support and a polysulfone layer have an absolute effect on compression modulus of the reverse osmosis membrane, and in order to obtain target compression modulus of the reverse osmosis membrane in one embodiment of the present specification, a thickness or materials of the support comprised in the reverse osmosis membrane, presence of the polysulfone layer, a thickness of the polysulfone layer, and a content, a composition and the like of polysulfone comprised in a polymer solution comprising the polysulfone when preparing the polysulfone layer can be controlled.

Specifically, compression modulus of the reverse osmosis membrane can be controlled by a thickness of the support, a thickness of the polysulfone layer and a content of polysulfone comprised in a polymer solution comprising the polysulfone.

In one embodiment of the present specification, the support has a thickness of 90 μm to 120 μm, and the polysulfone layer has a thickness of 25 μm to 80 μm.

The support can have a thickness of 90 μm to 100 μm, and preferably 93 μm to 95 μm. When the support has a thickness of less than 90 μm, durability of the reverse osmosis membrane can decline due to an insufficient role as a support, and when the thickness is greater than 120 μm, a flow rate can decrease, and compression modulus can decrease.

In addition, the polysulfone layer can specifically have a thickness of 30 μm to 75 μm, and preferably 33 μm to 70 μm. When the polysulfone layer has a thickness of less than 25 μm, durability of the reverse osmosis membrane can decline due to an insufficient role as a support layer, and when the thickness is greater than 80 μm, a flow rate can decrease, and compression modulus can decrease.

When the support and the polysulfone layer each satisfy the above-mentioned thickness ranges, excellent compression modulus of the reverse osmosis membrane aimed in the present disclosure can be obtained.

In one embodiment of the present specification, the thickness of the support and the thickness of the polysulfone layer can be measured using a digimatic thickness gauge after preparing a sample by cutting the reverse osmosis membrane to 10 cm×10 cm. The thickness can be obtained as the average value after measuring the thickness 5 times using the digimatic thickness gauge.

The digimatic thickness gauge can be from Mitutoyo Corporation, but is not limited thereto, and those known in the art can be used.

In one embodiment of the present specification, the polysulfone layer is formed with a polymer solution comprising polysulfone, and a content of the polysulfone comprised in the polysulfone-comprising polymer solution can be from 15% by weight to 20% by weight based on the total weight of the polysulfone-comprising polymer solution. Preferably, the content can be from 16% by weight to 18% by weight.

When the polysulfone content is 15% by weight or greater, strength of the reverse osmosis membrane can be maintained, and when the content is 20% by weight or less, the reverse osmosis membrane can be readily manufactured since the polysulfone concentration is not high.

When the polysulfone content is satisfied, 1 g/m² to 5 g/m² of the polysulfone can be impregnated into the support when forming the polysulfone layer on the support. When the polysulfone is impregnated into the support in the above-mentioned content, elastic modulus increases by increasing density per unit area of the support, and elasticity of the support layer comprising the support and the polysulfone layer can become superior.

As for measuring the amount of the polysulfone impregnated into the support, a method of drying the reverse osmosis membrane for 24 hours in a vacuum desiccator, attaching a tape thereto to the same area as the support area in order to remove the polysulfone layer on the support, and then removing the tape at once can be used. Then, the impregnated polysulfone is eluted using dichloromethane, and a difference between the initial weight of the reverse osmosis membrane and the weight of the reverse osmosis membrane after polysulfone elution is measured to measure the amount of the impregnated polysulfone.

In one embodiment of the present specification, the polysulfone-comprising polymer solution can comprise a residual solvent in addition to the polysulfone. The solvent is not particularly limited as long as it is capable of dissolving polysulfone, and those known in the art can be used. For example, the solvent can be dimethylformamide (DMF).

In addition, the polysulfone-comprising polymer solution can further comprise an additive as necessary. The additive can be, for example, polyethylene glycol (PEG), but is not limited thereto.

In one embodiment of the present specification, the polysulfone-comprising polymer solution can be prepared by introducing the polysulfone solid and, as necessary, the additive to the solvent, and stirring the result for 12 hours or longer at 80° C. to 85° C. Specifically, the stirring can be conducted for 12 hours at 80° C.

In one embodiment of the present specification, the support layer can be expressed as a porous support layer.

In one embodiment of the present specification, the support can include a non-woven fabric. In other words, the support can be formed with a non-woven fabric.

When the support is formed with a non-woven fabric, strength or permeability of the non-woven fabric-including support layer can be controlled by adjusting an average size of pores included in the non-woven fabric, a basis weight, density, air permeability and the like.

In one embodiment of the present specification, the non-woven fabric can have an average pore size of 3 µm to 10 µm, however, the average pore size is not limited thereto. When the non-woven fabric has an average pore size in the above-mentioned range, strength of the reverse osmosis membrane as a support can be maintained.

In another embodiment, the non-woven fabric can have a basis weight of 70 g/m² to 80 g/m², however, the basis weight is not limited thereto. When the non-woven fabric has a basis weight in the above-mentioned range, strength of the reverse osmosis membrane as a support can be maintained.

In another embodiment, the non-woven fabric can have density of 0.5 g/m³ to 1 g/m³, however, the density is not limited thereto. When the non-woven fabric has density in the above-mentioned range, strength of the reverse osmosis membrane as a support can be maintained.

In another embodiment, the non-woven fabric can have air permeability of 0.5 cc/cm²·sec to 2.5 cc/cm²·sec, however, the air permeability is not limited thereto. When the air permeability range is the above-mentioned range, strength of the reverse osmosis membrane as a support can be maintained.

In one embodiment of the present specification, the non-woven fabric can have a thickness of 90 µm to 120 µm. The thickness can be preferably from 90 µm to 100 µm, and more preferably from 93 µm to 95 µm. When the non-woven fabric has a thickness corresponding to the above-mentioned range, compression modulus of the reverse osmosis membrane including the non-woven fabric can increase.

Examples of a material of the non-woven fabric can include polyethylene terephthalate, polyester, polycarbonate, microporous polypropylene, polyphenylene ether, polyvinylidene fluoride and the like, however, the material is not limited thereto. The non-woven fabric can preferably be polyethylene terephthalate.

In one embodiment of the present specification, the polysulfone layer means a coating layer of a polymer material being formed on the support, and the polymer material means polysulfone, and the polysulfone is preferably a polymer having a sulfone group (—SO₂—). Specifically, the polymer having a sulfone group preferably includes the following repeating unit:

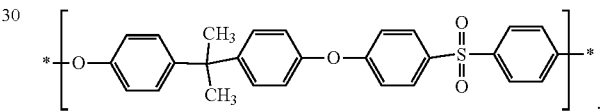

The "repeating unit" is a monomer forming a polymer, and the monomer can form a polymer by being comprised in the main chain in the polymer.

In the repeating unit, the part expressed by " — ." means a part linked to other substituents or linking groups.

In one embodiment of the present specification, the polysulfone layer can be formed using a method of casting using the polysulfone-comprising polymer solution. The casting means a solution casting method, and specifically, can mean a method of dissolving a polymer material in a solvent, developing the solution on a smooth surface with no adhesive property, and then evaporating the solvent. For example, methods of drop casting, spin coating, dip coating, slot die coating and the like can be included as an example, and slot die coating can be preferably used, however, the method is not limited thereto. In addition, a temperature can also be applied while evaporating the solvent, however, the method is not limited thereto as well.

In one embodiment of the present specification, a rate of defect occurrences when assembling the reverse osmosis membrane can be from 0% to 5%. Specifically, the rate of defect occurrences can be from 1% to 3%. When the rate of defect occurrences is greater than 5%, stable driving of a water-treatment module comprising the reverse osmosis membrane can be difficult.

The rate of defect occurrences when assembling the reverse osmosis membrane means, when measuring physical properties of a reverse osmosis membrane element, a finished product after assembly, a ratio of the number of reverse osmosis membrane elements failing to reach target physical properties based on the total number of the reverse osmosis membrane elements.

The reverse osmosis membrane element failing to reach target physical properties refers to, when conducting a rhodamine dyeing test on the reverse osmosis membrane element, a reverse osmosis membrane in which the rhodamine dye leaks, and this is referred to as a defective product.

Specifically, the rhodamine dyeing test is conducted by preparing a plurality of the reverse osmosis membranes according to one embodiment of the present specification, and dyeing the plurality of the reverse osmosis membranes with a rhodamine dye. Then, when performing an autopsy (disassembling the reverse osmosis membrane element, a finished product) process, a reverse osmosis membrane including a portion where rhodamine dye leak occurs, that is, a reverse osmosis membrane dyed with pink, is a defective product, and after counting the number of the defective products, the number is divided by the number of the total reverse osmosis membranes manufactured to calculate a rate of defect occurrences when assembling the reverse osmosis membrane.

One embodiment of the present specification provides a method for manufacturing the reverse osmosis membrane comprising forming a support layer comprising a support and a polysulfone layer; and forming an active layer on the support layer.

In the forming of a support layer comprising a support and a polysulfone layer in one embodiment of the present specification, the descriptions provided above apply to the support and the polysulfone layer.

The forming of a support layer comprising a support and a polysulfone layer can comprise forming a polysulfone layer on a support.

The polysulfone layer can be foamed using the polysulfone-comprising polymer solution comprising the polysulfone in 10% by weight to 25% by weight based on the total weight of the polysulfone-comprising polymer solution. The descriptions provided above apply to the polysulfone-comprising polymer solution.

In one embodiment of the present specification, the active layer can mean a polyamide active layer, and the polyamide active layer can be formed through forming an aqueous solution layer comprising an amine compound on the support layer; and forming a polyamide active layer by bringing an organic solution comprising an acyl halide compound into contact with the amine compound-comprising aqueous solution layer thereon.

The polyamide active layer can be formed by producing polyamide by interfacial polymerization while the amine compound and the acyl halide compound react when the amine compound and the acyl halide compound are in contact with each other, and the polyamide being adsorbed on the support layer.

The contact can use methods such as dipping, spraying, coating or the like. As a condition for the interfacial polymerization, those known in the art can be used.

A method for forming the amine compound-comprising aqueous solution layer on the support layer is not particularly limited, and methods capable of forming an amine compound-comprising aqueous solution layer on the support layer can be used without limit. Specifically, a method for foaming the amine compound-comprising aqueous solution layer on the support layer can include spraying, coating, dipping, dropping or the like, and those known in the art can be used.

Herein, the amine compound-comprising aqueous solution layer can further go through removing an excess amine compound-comprising aqueous solution as necessary. The amine compound-comprising aqueous solution layer formed the support layer can be non-uniformly distributed when there are too much of the amine compound-comprising aqueous solution present on the support layer, and when the amine compound-comprising aqueous solution is non-uniformly distributed, a non-uniform polyamide active layer can be formed by subsequent interfacial polymerization. Accordingly, the excess amine compound-comprising aqueous solution is preferably removed after forming the amine compound-comprising aqueous solution layer on the support layer. A method of removing the excess amine compound-comprising aqueous solution is not particularly limited, however, methods using a sponge, an air knife, nitrogen gas blowing, natural drying, a compression roll or the like can be used.

In the amine compound-comprising aqueous solution, the amine compound is not limited in the type as long as it is an amine compound used in reverse osmosis membrane manufacturing, however, specific examples thereof can include m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine or mixtures thereof. Preferably, the amine compound is m-phenylenediamine.

The content of the amine compound can be from 1% by weight to 10% by weight based on the total weight of the amine compound-comprising aqueous solution. Specifically, the content can be from 3% by weight to 7% by weight.

The active layer can be formed by forming an amine compound-comprising aqueous solution layer through coating an amine compound-comprising aqueous solution on a support for the reverse osmosis membrane, and then bringing an acyl halide compound-comprising organic solution into contact with the aqueous solution layer, and interfacial polymerizing the result. A method of bringing the acyl halide compound-comprising organic solution into contact therewith is not particularly limited, and methods capable of interfacial polymerizing the acyl halide compound-comprising organic solution on the amine compound-comprising aqueous solution layer can be used without limit. For example, a coating method can be used.

In one embodiment of the present specification, the active layer can be a polyamide active layer.

The acyl halide compound is not limited as long as it can be used in polyamide polymerization, however, specific examples thereof can include, as an aromatic compound having 2 to 3 carboxylic acid halides, one type selected from the compound group consisting of trimesoyl chloride, isophthaloyl chloride and terephthaloyl chloride, or a mixture of two or more types thereof. Preferably, trimesoyl chloride can be used.

The content of the acyl halide compound can be from 0.05% by weight to 1% by weight based on the total weight of the acyl halide compound-comprising organic solution. Specifically, the content can be from 0.2% by weight to 0.8% by weight.

The amine compound-comprising aqueous solution can use water, acetone, dimethyl sulfoxide (DMSO), 1-methyl-2-pyrrolidinone (NMP), hexamethylphosphoramide (HMPA) or the like as a solvent, however, the solvent is not limited thereto. Water is preferred as the solvent.

The acyl halide compound-comprising organic solution can use, as a solvent, an aliphatic hydrocarbon solvent, for example, freons, hexane, cyclohexane and heptane having 5 to 12 carbon atoms, hydrophobic liquids that is not mixed with water such as alkane, for example, alkane having 5 to 12 carbon atoms, and a mixture thereof that is Isopar (Exxon), ISOL-C (SK Chem), ISOL-G (Exxon), Isopar G and the like, however, the solvent is not limited thereto. Isopar G is preferred as the solvent.

In one embodiment of the present specification, the active layer can have a thickness of 150 nm to 250 nm, and preferably 180 nm to 220 nm.

One embodiment of the present specification provides a water-treatment module comprising one or more of the reverse osmosis membranes.

In one embodiment of the present specification, the water-treatment module can comprise 1 to 50 and preferably 1 to 30 reverse osmosis membranes. However, the number is not limited thereto, and can be applied differently depending on whether the water-treatment module is used for sea to fresh water, industrial or household applications.

Specific types of the water-treatment module are not particularly limited, and examples thereof can include a plate & frame module, a tubular module, a hollow & fiber module, a spiral wound module or the like, however, a spiral wound module is preferred.

In addition, as long as the water-treatment module comprises the reverse osmosis membrane described above, the water-treatment module is not particularly limited in other constitutions and manufacturing methods, and general means known in the art can be employed without limit.

The water-treatment module according to one embodiment of the present specification can be used for sea to fresh water, industrial or household applications.

FIG. 1 illustrates the reverse osmosis membrane according to one embodiment of the present specification. Specifically, FIG. 1 illustrates the reverse osmosis membrane in which a support (100), a polysulfone layer (200) and an active layer (300) are consecutively provided, and as salt water (400) flows into the active layer (300), purified water (500) is discharge through the support (100), and concentrated water (600) is discharged outside failing to pass through the active layer (300). A support layer (700) comprising the support (100) and the polysulfone layer (200) has high mechanical strength with compression modulus of 20 MPa to 40 MPa, and can reduce a rate of defect occurrences when assembling the reverse osmosis membrane.

FIG. 2 illustrates the water-treatment module according to one embodiment of the present specification. Specifically, the water-treatment module is formed comprising a tube (40), a feed spacer (20), a reverse osmosis membrane (10), a tricot filtration channel (30) and the like. When flowing raw water to the water-treatment module, raw water is introduced through the feed spacer (20) in the water-treatment module. One or more of the reverse osmosis membranes (10) extend outwardly from the tube (40), and wound around the tube (40). The feed spacer (20) forms a passage through which raw water is introduced from the outside, and performs a role of maintaining a gap between one reverse osmosis membrane (10) and another reverse osmosis membrane (10). For this, the feed spacer (20) is wound around the tube (40) while being brought into contact with one or more of the reverse osmosis membranes (10) on the upper and the lower sides. The tricot filtration channel (30) generally has a fabric-type structure, and performs a role of a flow channel making space for purified water flowing through the reverse osmosis membrane (10). The tube (40) is located at the center of the water-treatment module, and performs a role of a passage through which filtered water is introduced and discharged. Herein, a pore having a certain size is preferably formed on the outer side of the tube (40) so as to introduce the filtered water, and it is preferred that one or more pores are formed. The reverse osmosis membrane (10) has compression modulus of 20 MPa to 40 MPa, and the water-treatment module comprising the reverse osmosis membrane (10) can be stably driven.

EXAMPLES

Hereinafter, the present specification will be described in detail with reference to examples in order to specifically describe the present specification. However, examples according to the present specification can be modified to various different forms, and the scope of the present specification is not construed as being limited to the examples described below. The examples of the present specification are provided in order to more fully describe the present specification to those having average knowledge in the art.

Preparation Example (Preparation of Support Layer)

Example 1

A non-woven fabric was used as a support, the non-woven fabric was polyethylene terephthalate, and polyethylene terephthalate having a thickness of 94 μm was used.

In order to prepare a polysulfone layer on the support, a polymer solution comprising polysulfone was prepared. The polysulfone-comprising polymer solution was a homogeneous liquid obtained by introducing 16% by weight of a polysulfone solid to 84% by weight of a dimethylformamide solvent based on the total weight of the polysulfone-comprising polymer solution, and dissolving for 12 hours at 80° C. to 85° C.

After that, the polysulfone-comprising polymer solution was cast to 33 μm on the support (polyethylene terephthalate) using a slot die coating method to prepare a polysulfone layer.

Through this, a support layer comprising a support and a polysulfone layer was prepared.

Examples 2 to 4

Support layers of Examples 2 to 4 were prepared in the same manner as in Example 1 except that the support thickness, the polysulfone layer thickness and the polysulfone content followed conditions described in the following Table 1.

Comparative Examples 1 to 4

In Comparative Examples 1 to 4, support thicknesses each followed conditions described in the following Table 1, and a support layer that did not form a polysulfone layer on a support (non-woven fabric) was used.

Comparative Examples 5 and 6

Support layers of Comparative Examples 5 and 6 were prepared in the same manner as in Example 1 except that the support thickness, the polysulfone layer thickness and the polysulfone content followed conditions described in the following Table 1.

TABLE 1

| | Support (Non-Woven Fabric) Thickness (μm) | Polysulfone Layer Thickness (μm) | Polysulfone Content (% by Weight) |
|---|---|---|---|
| Example 1 | 94 | 33 | 16 |
| Example 2 | 94 | 60 | 16 |
| Example 3 | 94 | 70 | 16 |
| Example 4 | 94 | 35 | 18 |
| Comparative Example 1 | 91 | — | — |
| Comparative Example 2 | 90 | — | — |
| Comparative Example 3 | 92 | — | — |
| Comparative Example 4 | 96 | — | — |
| Comparative Example 5 | 90 | 24 | 14 |
| Comparative Example 6 | 90 | 20 | 14 |

(Manufacture of Reverse Osmosis Membrane)

On each of the prepared support layers, an amine compound-comprising aqueous solution was prepared comprising 5% by weight of meta-phenylenediamine (m-PD) and 95% by weight of water as a solvent based on the total weight of the amine compound-comprising aqueous solution, and then the aqueous solution was coated on the support layer to form an amine compound-comprising aqueous solution layer.

After that, an organic solution was prepared comprising 0.5% by weight of trimesoyl chloride (TMC) in 99.5% by weight of an Isopar G solvent based on the total weight of the acyl halide compound-comprising organic solution, then the organic solution was coated on the amine compound-comprising aqueous solution layer, and after interfacial polymerizing the result, the result was dried for 5 minutes at 90° C. to form a polyamide active layer having a thickness of 200 nm, and as a result, a reverse osmosis membrane was manufactured.

(Measurement of Support and Polysulfone Layer Thicknesses)

As for the thicknesses of the supports and the polysulfone layers each manufactured, a sample was prepared by cutting the manufactured reverse osmosis membrane to 10 cm×10 cm, and then the thicknesses were measured using a digimatic thickness gauge. The thickness was measured 5 times using the digimatic thickness gauge, and the average value was calculated. The results are described in Table 1. The digimatic thickness gauge was from Mitutoyo Corporation.

Experimental Example (Measurement of Compression Modulus of Reverse Osmosis Membrane)

Using a TA.XTplus texture analyzer, a texture analyzer, compression modulus of each of the examples and the comparative examples was calculated by the following calculation formula using strain and stress measured under a condition of a circular probe diameter (D) of 5 mm, a compression rate of 0.1 mm/sec and a temperature of 25° C., and the results are described in the following Table 2.

⟨Calculation Formula⟩

$$\text{Compression modulus } (MPa) = \frac{\text{Stress}(MPa)}{\text{Strain}} = \frac{\left(\frac{F}{A}\right)}{\left(\frac{L}{Lo}\right)}$$

In the calculation formula,
F=force (gf) applied in the texture analyzer, $$A = \pi * \frac{D^2}{4}$$

L=thickness of the reverse osmosis membrane after the texture analyzer applies force (length, mm), and
Lo=thickness of the reverse osmosis membrane before the texture analyzer applies force (initial length, mm).

As shown in FIG. 3, a graph was plotted using strain obtained by the calculation formula as a horizontal axis and stress as a vertical axis, and by calculating the slope of the obtained graph, compression modulus (elastic modulus) was calculated, and the results are described in the following Table 2.

(Measurement of Rate of Defect Occurrences when Assembled)

After manufacturing a total of the 20 reverse osmosis membranes according to the examples and the comparative examples, a dyeing test was conducted using a rhodamine dye. Specifically, after dyeing a total of the 20 reverse osmosis membranes with a rhodamine dye, an autopsy (disassembling the reverse osmosis membrane element, a finished product) process was performed. After that, a portion where rhodamine dye leak occurred, that is, the number of the reverse osmosis membranes dyed with pink (defective product) was counted, and the number was divided by the number of the total reverse osmosis membranes manufactured to calculate a rate of defect occurrences when assembled. The results are described in the following Table 2.

TABLE 2

| | Compression Modulus (MPa) | Rate of Defect Occurrences (%) When Assembled |
|---|---|---|
| Example 1 | 21.1 | 2 |
| Example 2 | 23.2 | 2 |
| Example 3 | 25.3 | 1 |
| Example 4 | 27.0 | 3 |
| Comparative Example 1 | 19.3 | 10 |
| Comparative Example 2 | 18.0 | 14 |
| Comparative Example 3 | 19.8 | 13 |
| Comparative Example 4 | 17.5 | 17 |
| Comparative Example 5 | 17.0 | 20 |
| Comparative Example 6 | 16.5 | 23 |

According to Table 2, it was identified that Examples 1 to 4 had higher compression modulus compared to Comparative Examples 1 to 6. In addition, in the rate of defect occurrences when assembled, it was identified that Examples 1 to 4 had a significantly lower rate of defect occurrences compared to Comparative Examples 1 to 6.

Hereinbefore, preferred embodiments of the present disclosure have been described, however, the present disclosure is not limited thereto, and various modifications can be implemented in the scope of the claims and the scope of the detailed descriptions of the disclosure, and these also fall within the category of the present disclosure.

REFERENCE NUMERALS

10: Reverse Osmosis Membrane
20: Feed Spacer
30: Tricot Filtration Channel
40: Tube
100: Support
200: Polysulfone Layer
300: Active Layer
400: Salt Water
500: Purified Water
600: Concentrated Water
700: Support Layer
t: Z Axis Direction (Thickness Direction) of Reverse Osmosis Membrane

The invention claimed is:

1. A reverse osmosis membrane, comprising:
a support layer comprising a support and a polysulfone layer, wherein the support has a thickness of 93 μm to 95 μm, and 1 g/m² to 5 g/m² of polysulfone from the polysulfone layer is impregnated into the support, and the polysulfone layer has a thickness of 60 μm to 80 μm; and
an active layer,
wherein a compression modulus of the reverse osmosis membrane
is from 20 MPa to 40 MPa, wherein a rate of defect occurrence in the reverse osmosis membrane is in a range from 0% to 5%, and wherein the support comprises a non-woven fabric.

2. The reverse osmosis membrane of claim 1, wherein the polysulfone layer is formed with a polymer solution comprising polysulfone, and a content of the polysulfone contained in the polysulfone-comprising polymer solution is from 15% by weight to 20% by weight based on a total weight of the polysulfone containing polymer solution.

3. The reverse osmosis membrane of claim 1, which has a rate of defect occurrences of 0% to 5% when assembling the reverse osmosis membrane.

4. The reverse osmosis membrane of claim 1, wherein the non-woven fabric comprises polyethylene terephthalate, polycarbonate, microporous polypropylene, polyphenylene ether, or polyvinylidene fluoride.

5. The reverse osmosis membrane of claim 1, wherein the non-woven fabric has an average pore size of 3 μm to 10 μm.

6. A water-treatment module comprising one or more of the reverse osmosis membranes of claim 1.

7. A method for forming the reverse osmosis membrane of claim 1, the method comprising:
forming a support layer comprising a support and a polysulfone layer,
wherein the support comprises a non-woven fabric and has a thickness of 93 μm to 95 μm, 1 g/m² to 5 g/m² of polysulfone from the polysulfone layer is impregnated into the support, and the polysulfone layer has a thickness of 60 μm to 80 μm; and forming an active layer on the support layer.

8. The method of claim 7, wherein the forming the active layer is performed by:
dipping the support layer into an aqueous m-phenylenediamine (mPD) solution to form an mPD layer; and
dipping the support layer comprising the mPD layer into a solvent solution comprising an organic trimesoyl chloride, the mPD layer being brought into contact with the organic trimesoyl chloride, and interfacially polymerizing to form a polyamide active layer.

9. The method of claim 7, wherein the polysulfone layer is formed by casting a polymer solution comprising polysulfone on the support, and a content of the polysulfone comprised in the polysulfone-comprising polymer solution is from 15% by weight to 20% by weight based on a total weight of the polysulfone-comprising polymer solution.

* * * * *